US009811593B2

(12) United States Patent
Uchida et al.

(10) Patent No.: US 9,811,593 B2
(45) Date of Patent: Nov. 7, 2017

(54) COOKING RECIPE INFORMATION PROVIDING DEVICE, COOKING RECIPE INFORMATION PROVIDING METHOD, PROGRAM, AND INFORMATION STORAGE MEDIUM

(71) Applicant: Rakuten, Inc., Shinagawa-ku, Tokyo (JP)

(72) Inventors: Yuki Uchida, Suginami-ku (JP); Koichi Suto, Yokohama (JP); Hitoshi Matsumoto, Shibuya-ku (JP); Kazutoshi Ando, Setagaya-ku (JP)

(73) Assignee: Rakuten, Inc., Tokyo (JP)

( * ) Notice: Subject to any disclaimer, the term of this patent is extended or adjusted under 35 U.S.C. 154(b) by 348 days.

(21) Appl. No.: 14/372,556

(22) PCT Filed: Apr. 30, 2013

(86) PCT No.: PCT/JP2013/062642
§ 371 (c)(1),
(2) Date: Jul. 16, 2014

(87) PCT Pub. No.: WO2014/178120
PCT Pub. Date: Nov. 6, 2014

(65) Prior Publication Data
US 2015/0066909 A1    Mar. 5, 2015

(51) Int. Cl.
*G06F 7/00* (2006.01)
*G06F 17/30* (2006.01)
(Continued)

(52) U.S. Cl.
CPC ....... *G06F 17/30864* (2013.01); *G06Q 30/02* (2013.01); *G06F 17/3028* (2013.01); *G06Q 30/0621* (2013.01)

(58) Field of Classification Search
None
See application file for complete search history.

(56) References Cited

U.S. PATENT DOCUMENTS

2005/0192869 A1*  9/2005  Maeda ............... G06Q 30/0601
                                                            705/26.1
2009/0009815 A1   1/2009  Karasik et al.
(Continued)

FOREIGN PATENT DOCUMENTS

EP     2 701 087 A1    2/2014
JP     09-034871 A     2/1997
(Continued)

OTHER PUBLICATIONS

Japanese Office Action dated Sep. 17, 2013 issued in Application No. 2013-530440.
(Continued)

Primary Examiner — Jau-Shya Meng
(74) Attorney, Agent, or Firm — Sughrue Mion, PLLC

(57) ABSTRACT

A cooking recipe information providing device includes: a recipe extracting unit (16) for extracting a prescribed cooking recipe from a recipe information DB (14a) for storing cooking recipes; an evaluation value determining unit (18) for determining an evaluation value of the cooking recipe extracted by the recipe extracting unit (16) based on a place in order of a given ingredient in an ingredient field where ingredients of the cooking recipe are displayed; and a display data generating unit (19) for generating display data which indicates information of the cooking recipe based on the evaluation value determined by the evaluation value determining unit (18).

11 Claims, 11 Drawing Sheets

(51) Int. Cl.
*G06Q 30/02* (2012.01)
*G06Q 30/06* (2012.01)

(56) References Cited

U.S. PATENT DOCUMENTS

| | | | | |
|---|---|---|---|---|
| 2009/0083327 | A1* | 3/2009 | Ringham | G06Q 10/10 |
| 2013/0138656 | A1* | 5/2013 | Wheaton | G06F 17/30705 |
| | | | | 707/740 |
| 2013/0224694 | A1* | 8/2013 | Moore | G09B 19/0092 |
| | | | | 434/127 |
| 2014/0081955 | A1* | 3/2014 | Osaki | G06Q 10/10 |
| | | | | 707/722 |
| 2014/0089299 | A1* | 3/2014 | Kamei | G06Q 50/04 |
| | | | | 707/722 |
| 2014/0095479 | A1* | 4/2014 | Chang | G06F 17/30699 |
| | | | | 707/722 |
| 2015/0269661 | A1 | 9/2015 | Luke et al. | |

FOREIGN PATENT DOCUMENTS

| | | |
|---|---|---|
| JP | 09-034945 A | 2/1997 |
| JP | 2002-342668 A | 11/2002 |
| JP | 2007-164727 A1 | 6/2007 |
| JP | 2011-253312 A | 12/2011 |
| WO | 2011/037221 A1 | 3/2011 |
| WO | 2014/002512 A1 | 1/2014 |

OTHER PUBLICATIONS

International Search Report for PCT/JP2013/062642 dated May 28, 2013.
Written Opinion for PCT/JP2013/062642 dated May 28, 2013.
Mayumi Ueda et al., "Recipe Recommendation Method Based on Personal Use History of Foodstuff to reflect Personal Preference", DBSJ Letters, Mar. 21, 2008, pp. 29-32, vol. 6, No. 4.
Hidekazu Shiozawa, "Visual Search Interface for Cooking Recipes with the Priorities of Ingredients", Jul. 1, 2011, pp. 458-466, vol. J94-A, No. 7.
Office Action for related Japanese Patent Application No. 2014-518856 dated Jun. 10, 2014.
Communication dated Oct. 26, 2016 from the U.S. Patent and Trademark Office in counterpart U.S. Appl. No. 14/888,587.

* cited by examiner

FIG.3A

```
INGREDIENTS                                    CLOSE
SERVES [      ] PEOPLE
       INGREDIENT NAME              QUANTITY
31-1  [                          ]  [      ]
31-2  [                          ]  [      ]
                                         [ADD]
                    [SAVE]
```

FIG.3B

```
INGREDIENTS                                    CLOSE
SERVES [   1   ] PEOPLE
       INGREDIENT NAME              QUANTITY
31-1  [ PASTA                    ]  [ 100g   ]
31-2  [ CANNED TUNA              ]  [ 20g    ]
31-3  [ HEN OF THE WOODS         ]  [ 20g    ]
31-4  [ ERYNGII MUSHROOM         ]  [ 20g    ]
31-5  [ SOY SAUCE                ]  [ A LITTLE ]
31-6  [ BUTTER                   ]  [ SOME   ]
                                         [ADD]
                    [SAVE]
```

FIG.4

| RECIPE ID | 00123 |
|---|---|

| TITLE | BUTTER SOY SAUCE PASTA WITH TUNA AND MUSHROOMS |
|---|---|
| DISH NAME | JAPANESE PASTA |

INGREDIENTS (SERVES 1)

| PASTA | 100g |
|---|---|
| CANNED TUNA | 20g |
| HEN OF THE WOODS | 20g |
| ERYNGII MUSHROOM | 20g |
| SOY SAUCE | A LITTLE |
| BUTTER | SOME |

(RECIPE IMAGE)

COMMENT (TAG)

SHIITAKE MUSHROOM  CHEESE
EASY  SNACK  PASTA ······

HOW TO MAKE "BUTTER SOY SAUCE PASTA WITH TUNA AND MUSHROOMS"

| 1 | 2 | 3 |
|---|---|---|
| ················· ······· | ················· ······· | ················· ······· |
| (STEP IMAGE) | (STEP IMAGE) | (STEP IMAGE) |

FIG.6

| RECIPE ID | ***** |
|---|---|

| RECIPE ID | ***** |
|---|---|

| RECIPE ID | 00123 |
|---|---|
| TITLE | BUTTER SOY SAUCE PASTA WITH TUNA AND MUSHROOMS |
| DISH NAME | JAPANESE PASTA |
| INGREDIENTS | PASTA |
| | CANNED TUNA |
| | HEN OF THE WOODS |
| | ERYNGII MUSHROOM |
| | SOY SAUCE |
| | BUTTER |
| TAG | SHIITAKE MUSHROOM   CHEESE   EASY   SNACK   PASTA |

FIG.7

| RECIPE ID | EVALUATION VALUE |
|---|---|
| 00089 | 10 |
| 00095 | 8 |
| 00102 | 5 |
| 00123 | 11 |
| 00134 | 1 |
| 00156 | 7 |
| ⋮ | ⋮ |

FIG.8

| | | |
|---|---|---|
| | PASTA  SEARCH | |
| 1 | (RECIPE IMAGE) | BUTTER SOY SAUCE PASTA WITH TUNA AND MUSHROOMS<br>DISH NAME: JAPANESE PASTA<br>INGREDIENTS: PASTA, CANNED TUNA, HEN OF THE WOODS, ERYNGII MUSHROOM, SOY SAUCE, BUTTER<br>TAG: SHIITAKE MUSHROOM, CHEESE, EASY, SNACK, PASTA<br>ID : 00123 |
| 2 | (RECIPE IMAGE) | COD ROE CREAM SOUP PASTA<br>DISH NAME: PASTA WITH SPRING CABBAGE AND PORK<br>INGREDIENTS: PASTA, THICK SLICES OF PORK, CABBAGE, GARLIC, SALT, PEPPER<br>TAG: EASY, MOTHER'S DAY, FATHER'S DAY, ANNIVERSARY, PORK LOIN<br>ID : 00089 |
| ⋮ | ⋮ | ⋮ |

FIG.12

| RECIPE ID | 00015 |
| --- | --- |
| TITLE | CREAM PASTA WITH CHEESE |
| DISH NAME | CREAM PASTA |
| INGREDIENTS | CHEESE |
| | FRESH CREAM |
| | SALT |
| | PEPPER |
| | PASTA |
| | OLIVE OIL |
| TAG | MUSTARD   CREAMY<br>RICH FLAVOR   DIETING |

COOKING RECIPE INFORMATION PROVIDING DEVICE, COOKING RECIPE INFORMATION PROVIDING METHOD, PROGRAM, AND INFORMATION STORAGE MEDIUM

CROSS REFERENCE TO RELATED APPLICATIONS

This application is a National Stage of International Application No. PCT/JP2013/062642 filed Apr. 30, 2013, the contents of all of which are incorporated herein by reference in their entirety.

TECHNICAL FIELD

The present invention relates to a cooking recipe information providing device, a cooking recipe information providing method, a program, and an information storage medium.

BACKGROUND ART

There has been known a technology with which, when a user intending to search for a desired cooking recipe inputs a keyword associated with the cooking recipe to a user terminal, cooking recipes that include the keyword are extracted and a search result page showing information of the extracted cooking recipes is presented to the user (see Patent Literature 1, for example). In the case where the user inputs "pasta" as a keyword, for example, the user terminal displays a search result page showing information of a plurality of cooking recipes whose dish names or the like include "pasta", e.g., "cream pasta" and "tomato pasta".

CITATION LIST

Patent Literature

[Patent Literature 1] JP 2007-164727 A

SUMMARY OF INVENTION

Technical Problems

A problem of the related art is that cooking recipes that are not desired by the user are displayed at the top of the search result page as a result of extracting a diversity of cooking recipes, such as cooking recipes that include the keyword input by the user in their dish names and ingredients, and cooking recipes that include the keyword input by the user in their ingredients but not in their dish names. For instance, when a cooking recipe "hamburger steak" includes "pasta" as an ingredient for a garnish, and a user inputs "pasta" as a keyword, information of the cooking recipe "hamburger steak" may be displayed at the top of the search result page. "Hamburger steak" in this case is not necessarily a cooking recipe desired by the user.

An operator who provides a cooking recipe Web page also encounters a problem in that, when cooking recipes that include an ingredient set by the operator side (for example, a seasonal ingredient) on a device of the operator side are to be introduced, cooking recipes that include the ingredient only in a small amount are displayed at the top of the recipe page. It is thus difficult to appropriately display cooking recipes related to a given ingredient with the related art.

The present invention has been made in view of the problems described above, and an object of the present invention is therefore to provide a cooking recipe information providing device, a cooking recipe information providing method, a program, and an information storage medium which are capable of displaying cooking recipes related to a given ingredient appropriately.

Solution to Problems

In order to solve the above-mentioned problems, according to one embodiment of the present invention, there is provided a cooking recipe information providing device, including: recipe extracting means for extracting a prescribed cooking recipe from storage means for storing cooking recipes; evaluation value determining means for determining an evaluation value of the prescribed cooking recipe extracted by the recipe extracting means based on a place in order of a given ingredient in an ingredient field where ingredients of the prescribed cooking recipe are displayed; and display data generating means for generating display data which indicates information of the prescribed cooking recipe based on the evaluation value determined by the evaluation value determining means.

Further, according to one embodiment of the present invention, there is provided a cooking recipe information providing method, including: extracting a prescribed cooking recipe from storage means for storing cooking recipes; determining an evaluation value of the prescribed cooking recipe extracted by the recipe extracting means based on a place in order of a given ingredient in an ingredient field where ingredients of the prescribed cooking recipe are displayed; and generating display data which indicates information of the prescribed cooking recipe based on the evaluation value determined by the evaluation value determining means.

Further, according to one embodiment of the present invention, there is provided a program for causing a computer to function as: recipe extracting means for extracting a prescribed cooking recipe from storage means for storing cooking recipes; evaluation value determining means for determining an evaluation value of the prescribed cooking recipe extracted by the recipe extracting means based on a place in order of a given ingredient in an ingredient field where ingredients of the prescribed cooking recipe are displayed; and display data generating means for generating display data which indicates information of the prescribed cooking recipe based on the evaluation value determined by the evaluation value determining means.

Further, in order to solve the above-mentioned problems, according to one embodiment of the present invention, there is provided an information storage medium having recorded thereon a program for causing a computer to function as: recipe extracting means for extracting a prescribed cooking recipe from storage means for storing cooking recipes; evaluation value determining means for determining an evaluation value of the prescribed cooking recipe extracted by the recipe extracting means based on a place in order of a given ingredient in an ingredient field where ingredients of the prescribed cooking recipe are displayed; and display data generating means for generating display data which indicates information of the prescribed cooking recipe based on the evaluation value determined by the evaluation value determining means.

Advantageous Effects of Invention

According to one embodiment of the present invention, the evaluation value of the cooking recipe is determined based on the place in order of the given ingredient in the ingredient field for displaying the ingredients of the cooking recipe, and the information of the cooking recipe is provided based on the determined evaluation value. In this manner, the importance of an ingredient to a cooking recipe can be reflected, and cooking recipes related to a given ingredient are thus displayed appropriately.

BRIEF DESCRIPTION OF DRAWINGS

FIG. 3A is diagrams illustrating a display example of an ingredient registration screen.

FIG. 3B is diagrams illustrating a display example of an ingredient registration screen.

FIG. 4 is a diagram illustrating a display example of a recipe page.

FIG. 6 is a diagram illustrating an example of a recipe information list.

FIG. 7 is a diagram showing an example of an evaluation value list.

FIG. 8 is a diagram illustrating an example of a search result page.

FIG. 12 is a diagram illustrating an example of a recipe information list.

DESCRIPTION OF EMBODIMENTS

First Embodiment

A first embodiment of the present invention is described below with reference to the drawings.

Figure 1:
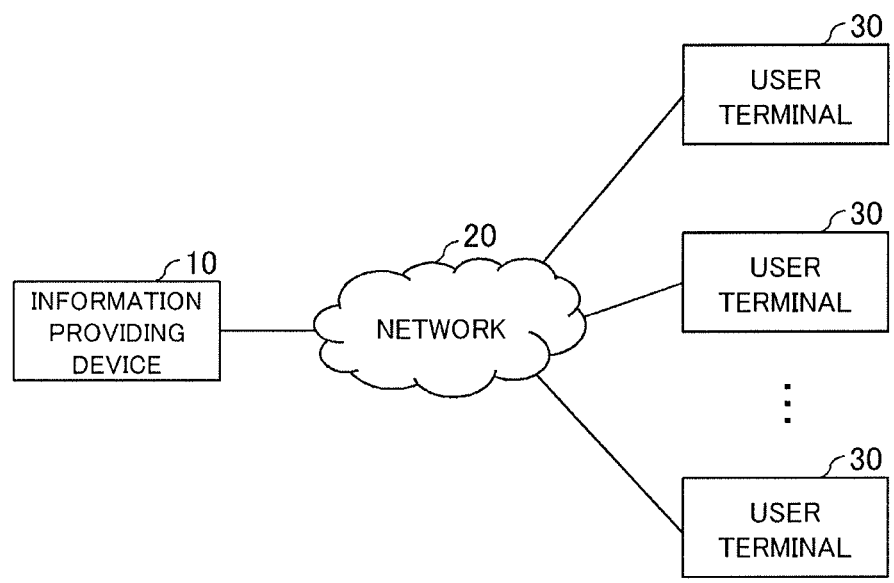
FIG. 1 is a configuration diagram of a cooking recipe information providing system according to a first embodiment of the present invention.

FIG. 1 is a diagram illustrating an example of the schematic configuration of a cooking recipe information providing system according to the first embodiment of the present invention. As illustrated in FIG. 1, the cooking recipe information providing system includes an information providing device 10 (a cooking recipe information providing device) which provides information of a cooking recipe (hereinafter referred to as recipe), and a plurality of user terminals 30 connected to the information providing device 10 via a communication network 20. The information providing device 10 and each user terminal 30 transmit/receive data to/from each other over the communication network 20, which is the Internet or the like. In the cooking recipe information providing system, when a user inputs a keyword for a desired recipe (a search keyword) to one of the user terminals 30, for example, the information providing device 10 receives the keyword, extracts recipes based on the keyword, and causes the user terminal 30 to display information of the extracted recipes.

Figure 2:
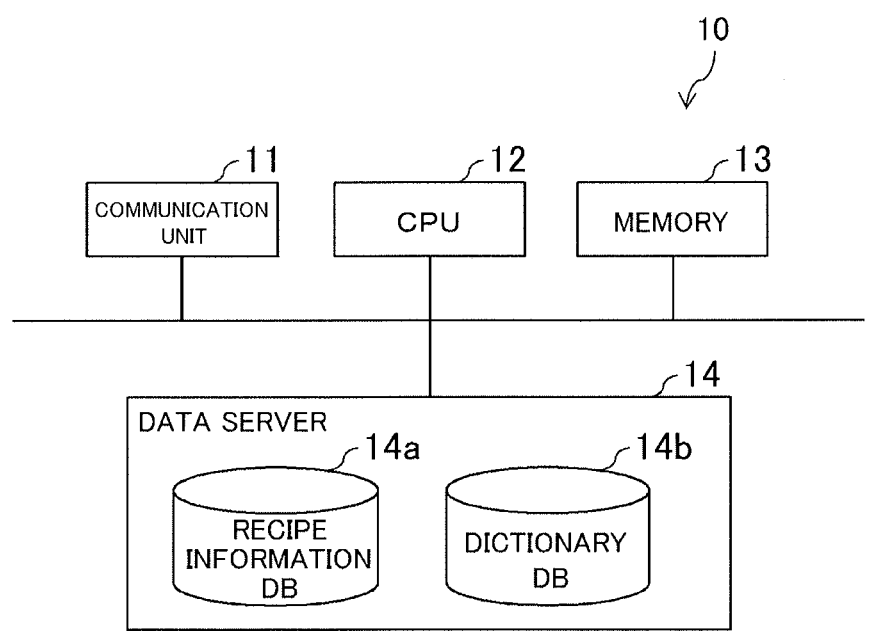
FIG. 2 is a hardware configuration diagram of an information providing device.

FIG. 2 is a hardware configuration diagram of the information providing device 10. As illustrated in FIG. 2, the information providing device 10 is a computer that includes a communication unit 11, a CPU 12, a memory 13, and a data server 14. These hardware components are connected by a bus in a manner that allows an exchange of data among the components. The communication unit 11 communicates data to and from the user terminals 30 over the Internet, for example. The CPU 12 controls the components of the device and executes various types of information processing. The memory 13 holds various programs and data. A work area of the CPU 12 is also secured in the memory 13.

The data server 14 includes databases such as a recipe information DB 14a and a dictionary DB 14b. The recipe information DB 14a stores a recipe information list which lists, for each recipe posted by a user, pieces of information of the recipe. Recipe information includes a recipe ID, a title, a dish name, ingredient names, a tag, the number of people served, a recipe image, steps, a posted date/time, and the like, and these pieces of recipe information are stored in association with one another for each recipe.

The dictionary DB 14b stores information about keywords received from the user terminals 30, such as a keyword's synonyms, hypernyms, and hyponyms. The dictionary DB 14b may be a dictionary server device which is provided outside the information providing device 10 and which executes various types of processing related to an encyclopedia site. In this case, the encyclopedia site is a Website that gives out descriptions of various topics, and the dictionary server device, receiving a keyword from one of the user terminals 30 or the information providing device 10, transmits a Web page that holds a description on a topic indicated by the keyword.

Each user terminal 30 is a terminal device of a user who uses various Websites. The user terminal 30 accesses the information providing device 10 as operated by the user. The user terminal 30 thus receives display data such as an HTML document from the information providing device 10 to display a Web page or the like. A browser, an electronic mail client, and other types of software are installed in the user terminal 30. The user terminal 30 can be, for example, a personal computer, a personal digital assistant (PDA), a smartphone or other portable information terminals, or a cellular phone.

[Posting and Displaying of a Recipe]

How a recipe is posted and displayed is described with reference to FIGS. 3A, 3B, and 4.

A user who wishes to post a recipe to a recipe site uses one of the user terminals 30 to input recipe information. The information providing device 10 registers the input recipe information in the recipe information DB 14a, thereby completing the posting of the recipe. A method of registering ingredients is described below as an example.

To register ingredients, the user selects an ingredient registration form on a Web page for inputting recipe information which is displayed on a screen of the user terminal 30, for example. This causes the screen of the user terminal 30 to display an ingredient registration screen as illustrated in FIG. 3A. The ingredient registration screen displays a plurality of ingredient registration areas 31-1 to 31-$n$ and a save button. The symbol n represents the place in order of an ingredient name in an ingredient field. This order corresponds to a display order in a list of ingredients on a recipe page displayed on the screen of the user terminal 30. For example, the plurality of ingredient registration areas 31-$n$ are displayed with the ingredient registration area 31-1 at the top, then the ingredient registration area 31-2, and so on in order. Each ingredient registration area 31-n is an area for inputting information of one ingredient (an ingredient name). Each ingredient registration area 31-n includes an ingredient name input field and a quantity input field. While two ingredient registration areas 31-n are displayed in FIG. 3A, the count of the ingredient registration areas 31-n can be increased and decreased by the user's operation.

FIG. 3B illustrates a display example of the ingredient registration screen that is displayed when ingredient names are input for a title "butter and soy sauce pasta with tuna and mushrooms". As illustrated in FIG. 3B, the user inputs "pasta", "canned tuna", "hen of the woods", "eryngii mushroom (*Pleurotus eryngii*)", "soy sauce", and "butter" as ingredient names in the ingredient registration areas 31-1 to 31-6. When the user selects the save button, the input ingredient names are saved and the Web page for inputting recipe information is displayed again. This completes the registration of ingredients.

The user inputs various other pieces of recipe information, namely, the title, the dish name, a tag, and the like. After the user's operation for registering recipe information is finished, the information providing device 10 registers the input recipe information in the recipe information DB 14a. This completes the posting of a recipe.

FIG. 4 is a display example of the recipe page. The recipe page is a Web page for displaying posted recipe information on the user terminal 30. As illustrated in FIG. 4, the recipe page displays a recipe ID, a title, a dish name, ingredients, the number of people served, a tag (comment), a recipe image, steps, and the like. The recipe ID is identification information of a recipe. The title is information indicating the characteristics, nature, and the like of the dish in question which is named by the user. The dish name is a generic term for the dish, for example, a name selected from a dish name list by the user's recipe information inputting operation. The ingredients indicate ingredients for the recipe in question which are input by the user. The number of people served indicates how many people can be served with the quantities of ingredients that are displayed in the ingredient field. The ingredient field displays, for each ingredient, an ingredient name and a quantity. The order (display order) in which ingredients are displayed in the ingredient field matches the order (display order) in which ingredient names are input by the user on the ingredient registration screen. The tag indicates a comment, keyword, or the like registered by the user. Specifically, the tag indicates the characteristics, related information, or the like of the recipe. A posted date/time indicates a date/time at which the recipe has been posted by the user. The recipe image indicates an image of the recipe that is registered by the user. The steps indicate cooking steps, and a step field displays text and images illustrating the cooking steps.

[Providing of Recipe Information]

To search for a desired recipe, the user inputs a keyword associated with the desired recipe to the user terminal 30. The information providing device 10 receives the keyword from the user terminal 30, extracts recipe information based on the keyword, and transmits to the user terminal 30 a search result page that shows the extracted cooking recipe information. A concrete configuration of the information providing device 10 that has the functions described above is described below.

Figure 5:
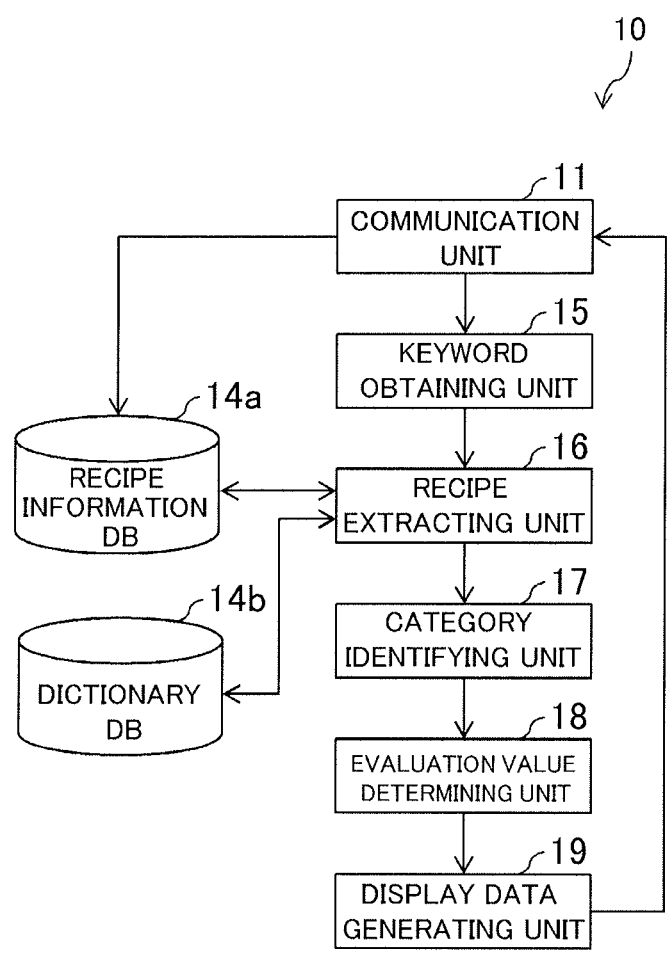
FIG. 5 is a function block diagram of the information providing device.

FIG. 5 is a function block diagram of the information providing device 10. As illustrated in FIG. 5, the information providing device 10 includes, in terms of function, a keyword obtaining unit 15, a recipe extracting unit 16, a category identifying unit 17, an evaluation value determining unit 18, and a display data generating unit 19. These components are implemented by the CPU 12 by executing a program that is stored in the memory 13 (see FIG. 2). The program may be installed in the information providing device 10 from a computer-readable information storage medium such as a CD-ROM, a DVD-ROM, and a memory card, or may be downloaded from a communication network such as the Internet.

The keyword obtaining unit 15 obtains, via the communication unit 11, a keyword input to the user terminal 30 by the user. The user inputs, for example, "pasta" or "hamburger steak" as a keyword.

The recipe extracting unit 16 extracts, from the recipe information DB 14a, recipes (recipe IDs) that include a keyword obtained by the keyword obtaining unit 15 in recipe information. For instance, when the keyword is "pasta" and a recipe includes the word "pasta" in at least one of pieces of recipe information, such as the title, the dish name, ingredients, and tags, the recipe is extracted. Through this processing, recipes that include "pasta" only in their ingredients and none of their titles, dish names, and tags, for example, are extracted as well.

The recipe extracting unit 16 obtains, from the dictionary DB 14b, words associated with the keyword (associated words), and additionally extracts recipes that include the associated words in recipe information. The associated words include synonyms, hypernyms, hyponyms, and the like. For instance, in the case where "spaghetti" is stored in the dictionary DB 14b as an associated word of "pasta", the recipe extracting unit 16 extracts recipes (recipe IDs) that include "spaghetti" in recipe information. The recipe extracting unit 16 thus extracts not only recipes that include a keyword but also recipes that include a word associated with the keyword. The following description takes as an example a case where a word that matches a keyword is included in recipe information, and a description on a case where recipe information includes an associated word is omitted.

The category identifying unit 17 identifies, for each recipe (recipe ID) extracted by the recipe extracting unit 16, to which category the keyword belongs. A category is one of the pieces of recipe information that indicates the characteristics or nature of a recipe, and can be "title", "dish name", "ingredient", or "tag", for example. In short, the category identifying unit 17 identifies which of the categories "title", "dish name", "ingredient", and "tag" includes the keyword.

The evaluation value determining unit 18 determines, for each recipe (recipe ID) extracted by the recipe extracting unit 16, an evaluation value based on the result of the identification by the category identifying unit 17. An evaluation value is set to each category in advance. The evaluation value is set and changed by the operator of the information providing device 10. For example, an evaluation value "2" is set to the category "title", an evaluation value "3" is set to "dish name", and an evaluation value "1" is set to "tag". One of evaluation values "1" to "5" that is determined based on the place in order in the ingredient field is set to "ingredient". The evaluation value determining unit adds up the evaluation value of every category that includes a keyword in question for each recipe (recipe ID), and determines the sum as the evaluation value of the recipe. For instance, a recipe whose recipe ID is "00102" and which includes a keyword "pasta" only in "title" and "dish name" has an evaluation value "5", and a recipe whose recipe ID is "00134" and which includes the keyword "pasta" in the category "tag" alone has an evaluation value "1".

[Ingredient Evaluation Value Determining Method 1]

A description is given on an example of a method of determining the evaluation value of the category "ingredient" when a keyword is included in "ingredient". FIG. 6 illustrates an example of a recipe information list which is registered for each recipe in the recipe information DB 14a. In FIG. 6, a recipe ID and pieces of information of the respective categories are illustrated for each recipe whereas a recipe image associated with the recipe and other types of information are omitted.

In the recipe information list of FIG. 6, the order of ingredients correspond to the order of the ingredient registration areas 31-1 to 31-n (see FIGS. 3A and 3B), and indicates the display order in the ingredient field of the recipe page displayed on the user terminal 30.

Users posting a recipe tend to determine the order of ingredients in the ingredient field in accordance with the levels of importance of the respective ingredients to the recipe. For instance, an ingredient in a higher place in order is likely to have a higher level of importance. This is because ingredients are one of factors that determine the characteristics and nature of a dish, and a main ingredient, in particular, has a high chance of being an ingredient that dictates the characteristics of a dish. The evaluation value of an ingredient that is in the first place in order in the ingredient field is therefore set to "5", and the evaluation values of ingredients that follow are set to "4" to "1" in order. In the case where there are six or more ingredients, the evaluation values of the sixth ingredient and subsequent ingredients are set to "1" or "0".

The evaluation value determining unit 18 thus determines the evaluation value of the category "ingredient" based on the place in order of an ingredient. In this way, a recipe is given a high evaluation value when an ingredient in question has a high importance to the recipe.

[Ingredient Evaluation Value Determining Method 2]

The method of determining the evaluation value of the category "ingredient" is not limited to the one described above. For instance, the evaluation value determining unit 18 may determine the category's evaluation value based on the place in relative order (relative position) of a keyword in question in the ingredient field. Specifically, the evaluation value determining unit 18 determines the category's evaluation value based on the place in relative order of the keyword in relation to all ingredients listed in the ingredient field, which displays ingredients of a recipe. When a keyword is included among ingredients, the evaluation value determining unit 18 determines the evaluation value of the category "ingredient" by multiplying a fixed evaluation value which is set in advance by a relativity coefficient K1. The relativity coefficient K1 is calculated by, for example, the following Expression (1).

$$K1=((\text{ingredient count})-(\text{place in order of keyword})+1)/(\text{ingredient count}) \quad (1)$$

The fixed evaluation value is set to, for example, a maximum value "5". In the case where six ingredients, for example, are registered in the ingredient field and the keyword is registered in the first place in the ingredient field, the relativity coefficient K1 is calculated by the above Expression (1) as 1, and the evaluation value of the category "ingredient" is determined as "5". In the case where six ingredients, for example, are registered in the ingredient field and the keyword is registered in the fourth place in the ingredient field, the relativity coefficient K1 is calculated by the above Expression (1) as 0.5, and the evaluation value of the category "ingredient" is determined as "2.5". In the case where twelve ingredients, for example, are registered in the ingredient field and the keyword is registered in the fourth place in the ingredient field, the relativity coefficient K1 is calculated by the above Expression (1) as 0.75, and the evaluation value of the category "ingredient" is determined as "3.75". In this manner, the importance of an ingredient to a recipe can be reflected appropriately by determining the category's evaluation value based on the place in relative order (relative position) of a keyword in the ingredient field.

The evaluation value determining unit 18 determines the evaluation values of the respective categories for each recipe (recipe ID) in the manner described above, and determines a sum Es of these evaluation values as the evaluation value of the recipe. Specifically, the evaluation value determining unit 18 determines an evaluation value E1 of the category "title", an evaluation value E2 of the category "dish name", an evaluation value E3 of the category "ingredient", and an evaluation value E4 of the category "tag", and determines the sum Es of these evaluation values as the evaluation value of a recipe. In other words, the evaluation value Es is determined by the following Expression (2) when the [ingredient name evaluation value determining method 1] described above is employed, and is determined by the following Expression (3) when the [ingredient name evaluation value determining method 2] described above is employed.

$$Es=E1+E2+E3+E4 \quad (2)$$

$$Es=E1+E2+E3\times K1+E4 \quad (3)$$

The evaluation value determining unit 18 generates an evaluation value list which associates a recipe (recipe ID) and the evaluation value of the recipe. FIG. 7 shows an example of the evaluation value list.

The display data generating unit 19 selects recipes based on their evaluation values from the evaluation value list generated by the evaluation value determining unit 18, and generates display data about the selected recipes. The display data is, for example, an HTML document of a search result page which lists information of the plurality of selected recipes. The display data generating unit 19 may generate an HTML document of a search result page by sorting recipes on the evaluation value list in descending order of evaluation value and listing information of the recipes in the sorted order, or may generate an HTML document of a search result page by selecting top ten recipes in order of evaluation value and listing information of the selected recipes. The display data generating unit 19 also sets, in the display data, a link to the recipe page (see FIG. 4) which shows recipe information, and others. The display data generating unit 19 transmits the generated display data via the communication unit 11 to the user terminal 30 of the user who has input the keyword.

Receiving the display data (HTML document) from the information providing device 10, the user terminal 30 displays a search result page, for example, one illustrated in FIG. 8, on the screen based on the HTML document.

[Recipe Information Providing Processing]

Figure 9:
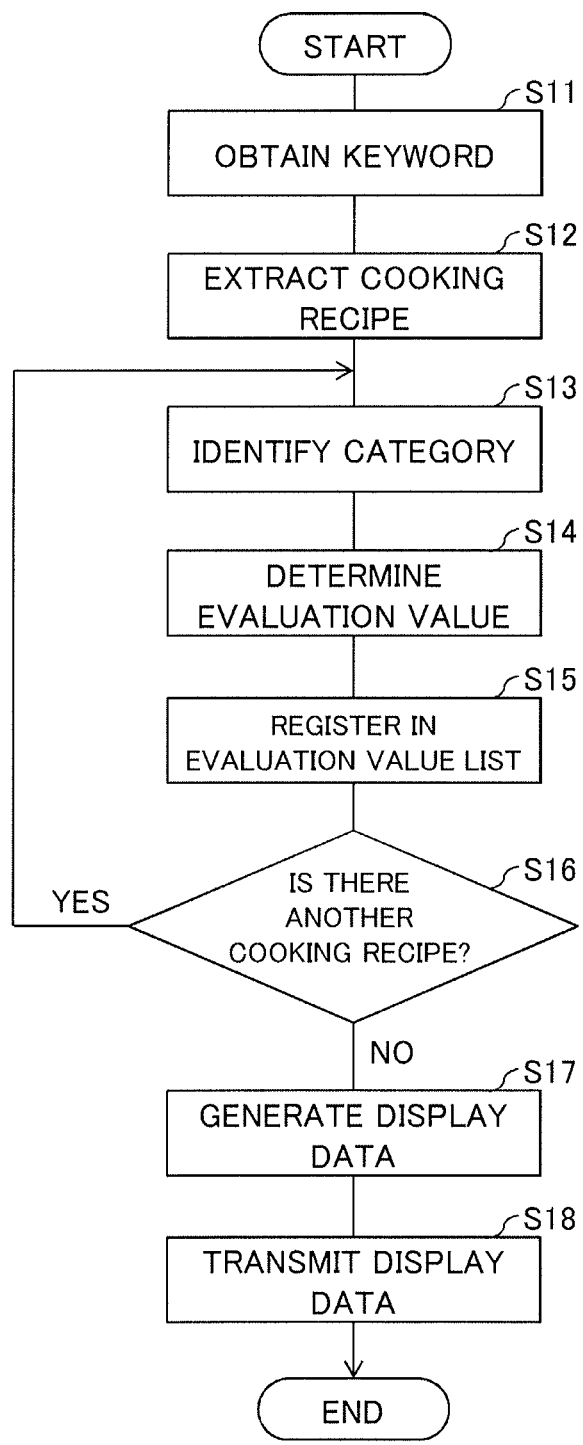
FIG. 9 is an operation flow chart of the information providing device.

Recipe information providing processing in the information providing device 10 is described. FIG. 9 is an operation flow chart of the information providing device 10. A case in which the user inputs "pasta" as a keyword is taken as an example here.

First, in Step (hereinafter abbreviated as S) 11, the keyword obtaining unit 15 obtains the keyword "pasta" from the user terminal 30 via the communication unit 11. Next, the recipe extracting unit 16 extracts, from the recipe information DB 14a, a plurality of recipes (recipe IDs) in which the keyword "pasta" is included in recipe information (S12). Next, the category identifying unit 17 identifies, for each recipe (recipe ID) extracted by the recipe extracting unit 16, which category includes the keyword "pasta" (S13).

Next, the evaluation value determining unit 18 determines, for each recipe (recipe ID) extracted by the recipe extracting unit 16, an evaluation value based on the result of the identification by the category identifying unit 17 (S14). For example, the evaluation value determining unit 18 determines the evaluation value E1 of the category "title" as "2" when the keyword "pasta" is included in "title", determines the evaluation value E2 of the category "dish name" as "3" when the keyword "pasta" is included in "dish name", and determines the evaluation value E4 of the category "tag" as "1" when the keyword "pasta" is included in "tag". The evaluation value determining unit 18 determines the evaluation value E3 of the category "ingredient" as one of "1" to "5" that is determined based on the place in order of the keyword in the ingredient field, when the keyword "pasta" is included in "ingredient".

The evaluation value determining unit 18 determines the evaluation values E1 to E4 of the respective categories for one recipe, and determines the sum Es of the evaluation values E1 to E4 as the evaluation value of the recipe. The evaluation value determining unit 18 then registers the recipe (recipe ID) and the evaluation value of the recipe in association with each other in the evaluation value list (see FIG. 7) (S15).

The category identifying unit 17 and the evaluation value determining unit 18 repeatedly execute the identification processing and evaluation value determining processing described above (S13 to S15) to process each recipe extracted by the recipe extracting unit 16 (S16).

When the identification processing and the evaluation value determining processing (S13 to S15) are finished for every relevant recipe (NO in S16), the display data generating unit 19 sorts recipe IDs on the evaluation value list generated by the evaluation value determining unit 18 in, for example, descending order of evaluation value, and generates display data (an HTML document, see FIG. 4) about recipes that are associated with the top ten recipe IDs (S17). The display data generating unit 19 transmits the generated display data to the relevant user terminal via the communication unit 11 (S18). This completes the recipe information providing processing in the information providing device 10.

Thereafter, the user terminal 3 receives the display data (HTML document) from the information providing device 10 and displays on the screen a search result page as a Web page (see FIG. 8). On the search result page, links are set in, for example, titles so that the user can view the Web page of a desired recipe (see FIG. 4) by selecting (clicking on) the title of the recipe.

As described above, the recipe information providing system according to the first embodiment displays recipes based on evaluation values that are determined based on the place in order of a given ingredient (here, an ingredient associated with a keyword) in the ingredient field. The recipe information providing system can therefore prevent recipes that are, for example, ones not desired by the user from being displayed at the top of the search result page. In the case where the keyword is "pasta", for example, a recipe "hamburger steak" in which "pasta" is included in its ingredients and the importance of "pasta" as an ingredient is low is given a low evaluation value and accordingly is not displayed at the top of the search result page. "Pasta" recipes desired by the user are displayed preferentially at the top of the search result page in this manner, and the user can thus view desired recipes.

Second Embodiment

A second embodiment of the present invention is described below with reference to the drawings. Note that, for convenience of the description, a component having the same function as that of the component described above in the first embodiment is denoted by the same reference numeral (and symbol) and the description thereof is omitted. Further, the terms defined in the first embodiment are used in accordance with their definitions also in this embodiment unless otherwise specified.

Figure 10:
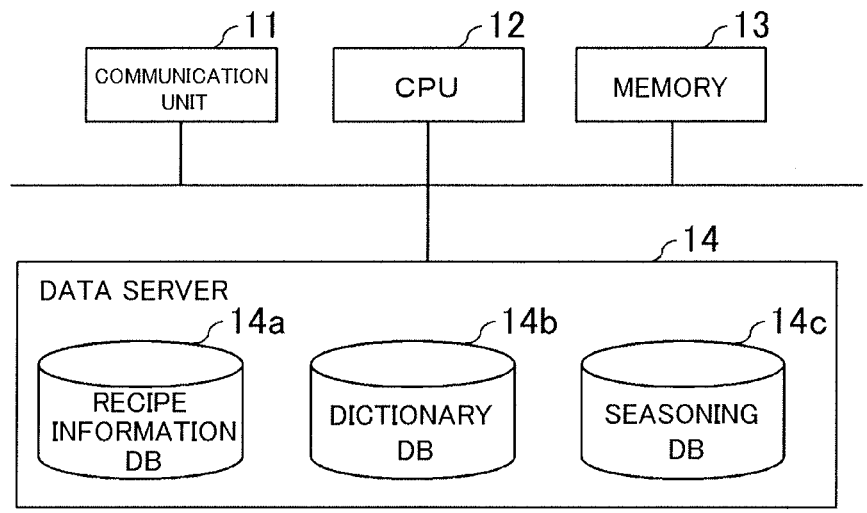
FIG. 10 is a hardware configuration diagram of an information providing device according to a second embodiment of the present invention.

FIG. 10 is a hardware configuration diagram of an information providing device 40 according to the second embodiment. As illustrated in FIG. 10, the information providing device 40 includes, in addition to the components of the information providing device 10 according to the first embodiment, a seasoning database (DB) 14c, which is included in the data server 14. Various seasonings such as salt, pepper, and soy sauce are registered in the seasoning DB 14c.

Figure 11:
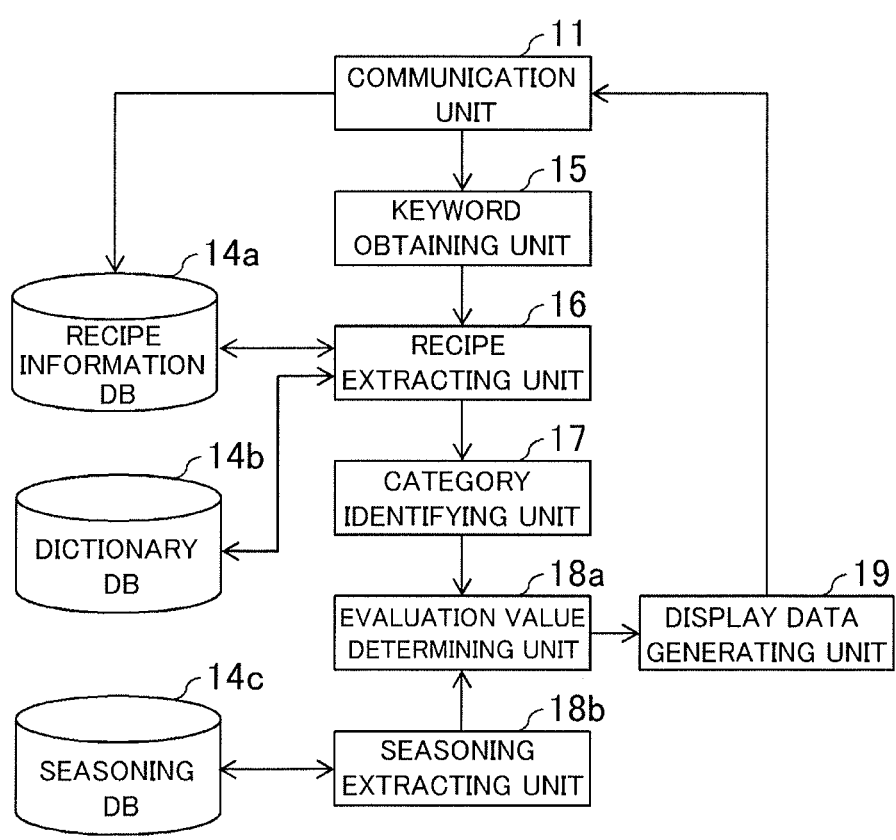
FIG. 11 is a function block diagram of the information providing device.

FIG. 11 is a function block diagram of the information providing device 40. As illustrated in FIG. 11, the information providing device 40 includes, in terms of function, the keyword obtaining unit 15, the recipe extracting unit 16, the category identifying unit 17, an evaluation value determining unit 18a, a seasoning extracting unit 18b, and the display data generating unit 19. These components are implemented by the CPU 12 by executing a program that is stored in the memory 13.

The seasoning extracting unit 18b refers to the seasoning DB 14c when a keyword input by a user is included among ingredients, and extracts, from recipe information (see FIG. 6), seasonings registered as ingredients in the ingredient field.

The evaluation value determining unit 18a determines an evaluation value for each recipe (recipe ID) based on the result of identification by the category identifying unit 17 and the result of the extraction by the seasoning extracting unit 18b. An evaluation value is set to each category in advance. For example, an evaluation value "2" is set to a category "title", an evaluation value "3" is set to "dish name", and an evaluation value "1" is set to "tag". One of evaluation values "1" to "5" that is determined based on the place in order in the ingredient field is set to "ingredient".

The evaluation value determining unit 18a in the information providing device 40 according to the second embodiment excludes seasonings when calculating the place in order of the keyword in the ingredient field for the category "ingredient". This is because a seasoning is unlikely to be the factor that determines the characteristics, nature, or the like of a dish. If seasonings are not excluded, in the case of a recipe "pasta" where "salt" is registered in the first place and "pasta" is registered in the second place in the ingredient field, for example, the evaluation value of the category "ingredient" is "4". However, in the recipe "pasta", the ingredient "pasta" has a higher importance than that of the seasoning "salt", and dictates the characteristics of the dish. The evaluation value determining unit 18a in the second embodiment therefore excludes the seasoning "salt" to regard "pasta" as an ingredient that takes the first place, and determines the category's evaluation value as "5".

FIG. 12 illustrates an example of recipe information. In the example of FIG. 12, the seasoning extracting unit 18b extracts "salt" and "pepper" as seasonings. Based on the result of the extraction by the seasoning extracting unit 18b, the evaluation value determining unit 18a regards the place in order of "pasta" in the ingredient field as the third place, and determines the evaluation value of the category "ingredient" as "3".

The method of determining the evaluation value of the category "ingredient" is not limited to the one described above, and the [ingredient name evaluation value determining method 2] described in the first embodiment may be employed. In other words, the evaluation value determining unit 18 may determine the category's evaluation value based on the place in relative order (relative position) of a keyword in question in the ingredient field. In the second embodiment, however, seasonings in the ingredient field are excluded in determining the relative order. Specifically, when a keyword is included among ingredients, a fixed evaluation value, which is set in advance, is multiplied by a relativity coefficient K2, which is calculated by the following Expression (4).

$$K2=\{((\text{ingredient count})-(\text{seasoning count}))-((\text{place in order of keyword})-(\text{seasoning count}))+1\}/((\text{ingredient count})-(\text{seasoning count})) \quad (4)$$

The evaluation value determining unit 18a determines the category's evaluation value by multiplying the fixed evaluation value by the relativity coefficient K2. The fixed evaluation value is set to, for example, a maximum value "5". In the example of FIG. 12, six ingredients are registered in the ingredient field, with the keyword "pasta" registered in the fifth place in the ingredient field and the seasonings "salt" and "pepper" registered in the third place and the fourth place, respectively, in the ingredient field. The relativity coefficient K2 calculated by the above Expression (4) is 0.75 in this case, and the evaluation value of the category "ingredient" is determined as "3.75" by multiplying the fixed value "5" by the relativity coefficient K2, "0.75". In this manner, the importance of an ingredient to a recipe can be reflected more appropriately by determining the category's evaluation value based on the place in relative order of a keyword in the ingredient field that excludes seasonings.

Figure 13:
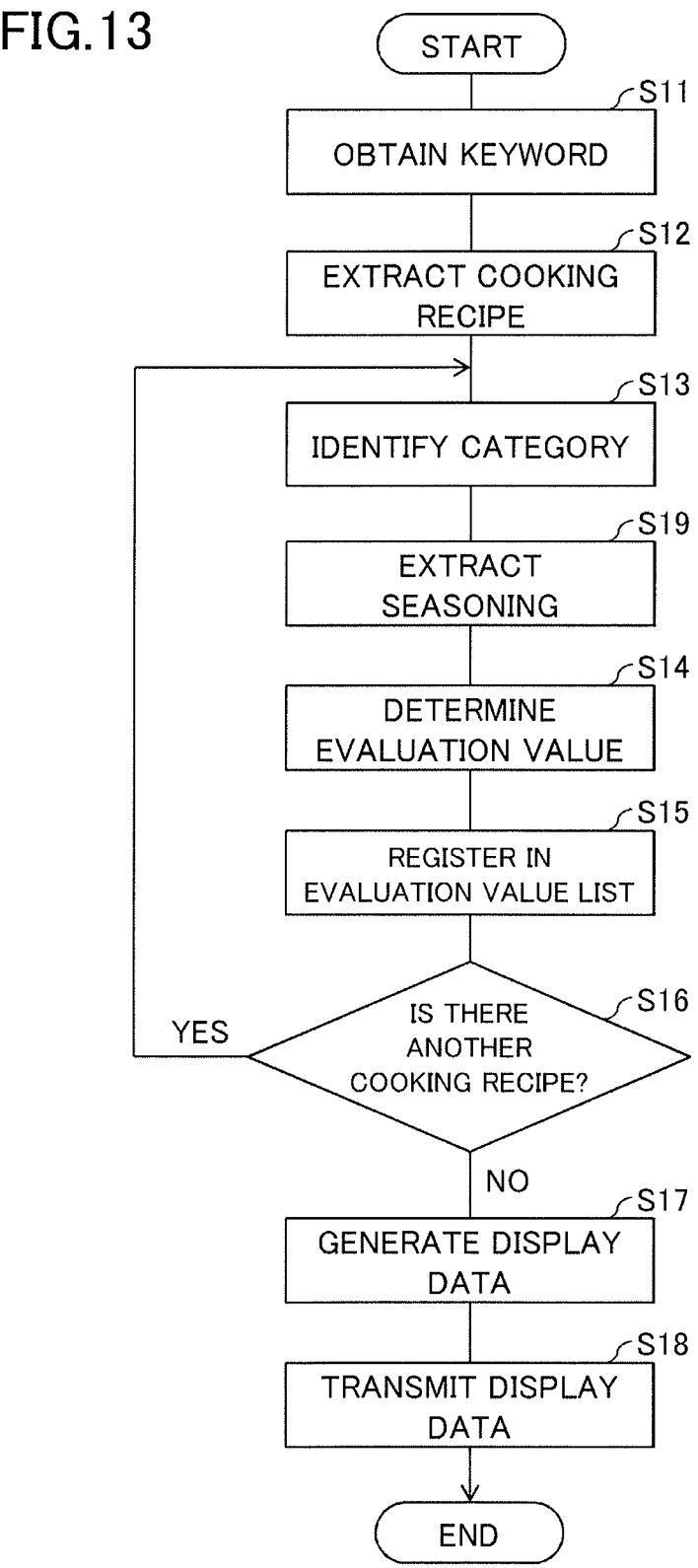
FIG. 13 is an operation flow chart of the information providing device.

FIG. 13 is an operation flow chart of the information providing device 40. In FIG. 13, processing in which the seasoning extracting unit 18b refers to the seasoning DB 14c to extract seasonings (S19) is added to the operation flow of the information providing device 10 according to the first embodiment (see FIG. 9). The rest of processing of the information providing device 40 is the same as that of the information providing device 10.

Figure 14:
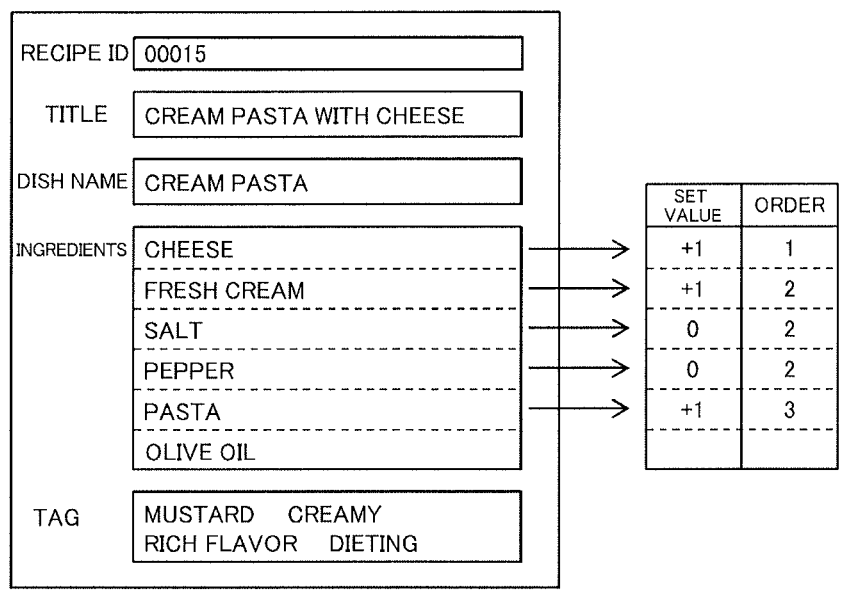
FIG. 14 is a diagram illustrating an example of a method of calculating the place in order of a keyword.

An example of a method of calculating the place in order of a keyword in the ingredient field is described. The evaluation value determining unit 18a determines whether an ingredient in the ingredient field of recipe information is a seasoning or not one row at a time, for example, and sets "0" when the ingredient is a seasoning and "+1" when the ingredient is not a seasoning. This is executed from the first row through the row where the keyword is included. The place in order of a keyword excluding seasonings can thus be calculated. In the example of recipe information of FIG. 12, the first row ("cheese") and second row ("cream cheese") of the ingredient field are each set to "+1", the third row ("salt") and the fourth row ("pepper") are each set to "0", and the fifth row ("pasta") is set to "+1". This puts the keyword "pasta" in the third row as illustrated in FIG. 14.

The first embodiment and second embodiment of the present invention have now been described. However, the present invention is not limited to the first embodiment and second embodiment described above. In the first embodiment and the second embodiment, the information providing device transmits recipe information based on a keyword that is input by the user and received from one of the user terminals 30 to the user terminal 30 upon reception of the keyword. The present invention is not limited thereto and, for example, the information providing device may provide recipe information to unspecified user terminals or other Web pages without receiving a keyword from a user terminal. For instance, the information providing device may compile recipe information for each recipe to transmit an updated recipe page regularly or irregularly to a user registered to a recipe Web page, or may introduce seasonal recipes on a recipe page that is open to public all the time. The information providing device in this case executes the recipe providing processing described above (see FIG. 9 and FIG. 13) with a recipe name (e.g., "pasta") of the recipe page, or the recipe name of a seasonal recipe, set as a keyword.

The information providing device specifically includes the recipe extracting unit 16 for extracting a prescribed cooking recipe from the recipe information DB 14a for storing cooking recipes, the evaluation value determining unit 18 for determining the evaluation value of the extracted cooking recipe based on the place in order of a given ingredient in the ingredient field where ingredients of the cooking recipe are displayed, and the display data generating unit 19 for generating display data which indicates information of the cooking recipe based on the determined evaluation value. The given ingredient encompasses an ingredient that is associated with (matches, is similar to, or the like) a keyword obtained by the keyword obtaining unit 15, and an ingredient set by the information providing device, for example, an ingredient associated with the recipe name of a particular recipe page or the recipe name of a seasonal recipe.

Lastly, an information providing device according to an embodiment of the present invention is outlined below.

The information providing device includes: recipe extracting means for extracting a prescribed cooking recipe from storage means for storing cooking recipes; evaluation value determining means for determining an evaluation value of the prescribed cooking recipe extracted by the recipe extracting means based on a place in order of a given ingredient in an ingredient field where ingredients of the prescribed cooking recipe are displayed; and display data generating means for generating display data which indicates information of the prescribed cooking recipe based on the evaluation value determined by the evaluation value determining means.

The information providing device may further include keyword obtaining means for obtaining a search keyword which relates to cooking recipes and which is input by a user, and the recipe extracting means may extract from the storage means a cooking recipe that is associated with the search keyword obtained by the keyword obtaining means.

In the information providing device, the evaluation value determining means may set a higher evaluation value to the prescribed cooking recipe extracted by the recipe extracting means when an ingredient that is associated with the search keyword obtained by the keyword obtaining means is in a higher place in order in the ingredient field where ingredients of the prescribed cooking recipe are displayed.

In the information providing device, the evaluation value determining means may determine the evaluation value of the prescribed cooking recipe extracted by the recipe extracting means based on the place in relative order of an ingredient that is associated with the search keyword obtained by the keyword obtaining means in relation to a plurality of ingredients included in the ingredient field where ingredients of the prescribed cooking recipe are displayed.

In the information providing device, the evaluation value determining means may determine the evaluation value for each cooking recipe extracted by the recipe extracting means.

In the information providing device, the evaluation value determining means may determine the evaluation value of the prescribed cooking recipe extracted by the recipe extracting means based on the place in order of an ingredient that excludes seasonings in the ingredient field where ingredients of the prescribed cooking recipe are displayed.

In the information providing device, the evaluation value determining means may determine the evaluation value of the prescribed cooking recipe based on the place in order of an ingredient that is associated with the search keyword obtained by the keyword obtaining means in the ingredient field where ingredients of the prescribed cooking recipe are displayed while excluding seasonings from the order.

The information providing device may further include seasoning extracting means for extracting seasonings from the ingredient field where ingredients of the prescribed cooking recipe are displayed, and the evaluation value determining means may determine the place in order of the ingredient that is associated with the search keyword obtained by the keyword obtaining means by excluding from the ingredient field the seasonings extracted by the seasoning extracting means.

In the information providing device, the display data generating means may generate the display data which lists pieces of the cooking recipe information in descending order of the evaluation value determined by the evaluation value determining means.

The invention claimed is:

1. A cooking recipe information providing device, comprising:
at least one memory that stores program code; and
at least one processor that executes the program code to perform:
extracting a prescribed cooking recipe including ingredients, from a storage that stores cooking recipes registered thereto, wherein a relative display order is assigned to each ingredient when the prescribed cooking recipe and the ingredients of the prescribed cooking recipe are registered, and the ingredients of the prescribed cooking recipe are displayed according to respective relative display orders in an ingredient field of the prescribed cooking recipe;
determining an evaluation value of the extracted prescribed cooking recipe based on a place in the relative display order of a given ingredient in the ingredient field where the ingredients of the prescribed cooking recipe are displayed; and
generating display data which indicates information of the prescribed cooking recipe based on the evaluation value.

2. The cooking recipe information providing device according to claim 1, wherein the at least one processor executes the program code to further perform obtaining a search keyword which relates to cooking recipes and which is input by a user,
wherein a cooking recipe that is associated with the obtained search keyword obtained is extracted from the storage.

3. The cooking recipe information providing device according to claim 2, wherein a higher evaluation value is set to the extracted prescribed cooking recipe when an ingredient that is associated with the obtained search keyword is in a higher place in the relative display order in the ingredient field where the ingredients of the prescribed cooking recipe are displayed.

4. The cooking recipe information providing device according to claim 2, wherein the evaluation value of the extracted prescribed cooking recipe is determined based on the place in the relative display order of an ingredient that is associated with the obtained search keyword in relation to a plurality of ingredients included in the ingredient field where the ingredients of the prescribed cooking recipe are displayed.

5. The cooking recipe information providing device according to claim 2, wherein the evaluation value is determined for each cooking recipe that is extracted.

6. The cooking recipe information providing device according to claim 2, wherein the evaluation value of the prescribed cooking recipe is determined based on the place in the relative display order of an ingredient that is associated with the obtained search keyword in the ingredient field where the ingredients of the prescribed cooking recipe are displayed while excluding seasonings from the order.

7. The cooking recipe information providing device according to claim 6, wherein the at least one processor executes the program code to further perform extracting seasonings from the ingredient field where the ingredients of the prescribed cooking recipe are displayed,
wherein the place in the relative display order of the ingredient that is associated with the obtained search keyword is determined by excluding from the ingredient field the extracted seasonings.

8. The cooking recipe information providing device according to claim 1, wherein the evaluation value of the extracted prescribed cooking recipe is determined based on the place in the relative display order of an ingredient that excludes seasonings in the ingredient field where the ingredients of the prescribed cooking recipe are displayed.

9. The cooking recipe information providing device according to claim 1, wherein the display data lists pieces of the cooking recipe information in descending order of the evaluation value.

10. A cooking recipe information providing method, comprising:
extracting, by a hardware processor, a prescribed cooking recipe including ingredients, from a storage that stores cooking recipes registered thereto, wherein a relative display order is assigned to each ingredient when the prescribed cooking recipe and the ingredients of the prescribed cooking recipe are registered, and the ingredients of the prescribed cooking recipe are displayed according to respective relative display orders in an ingredient field of the prescribed cooking recipe;
determining, by the hardware processor, an evaluation value of the extracted prescribed cooking recipe based on a place in the relative display order of a given ingredient in the ingredient field where the ingredients of the prescribed cooking recipe are displayed; and
generating, by the hardware processor, display data which indicates information of the prescribed cooking recipe based on the determined evaluation value.

11. A non-transitory computer readable storage medium having recorded thereon a program which, when executed by a computer, causes the computer to:

extract a prescribed cooking recipe including ingredients, from a storage that stores cooking recipes registered thereto, wherein a relative display order is assigned to each ingredient when the prescribed cooking recipe and the ingredients of the prescribed cooking recipe are registered, and the ingredients of the prescribed cooking recipe are displayed according to respective relative display orders in an ingredient field of the prescribed cooking recipe;

determine an evaluation value of the extracted prescribed cooking recipe based on a place in the relative display order of a given ingredient in the ingredient field where the ingredients of the prescribed cooking recipe are displayed; and generate display data which indicates information of the prescribed cooking recipe based on the evaluation value.

* * * * *